US006160605A

United States Patent [19]

Murayama et al.

[11] Patent Number: 6,160,605

[45] Date of Patent: *Dec. 12, 2000

[54] DISPLAY DEVICE WITH PARTICULAR EXTERNAL CONNECTIONS

[75] Inventors: Kazuhiko Murayama, Atsugi; Hideo Mori, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,546

[22] Filed: Dec. 13, 1995

[30] Foreign Application Priority Data

Dec. 14, 1994 [JP] Japan .................................... 6-310833

[51] Int. Cl.[7] ................................................ G02F 1/1345

[52] U.S. Cl. ............................................ 349/152; 349/149

[58] Field of Search ............................. 349/40, 143, 149, 349/150, 152, 7

[56] References Cited

U.S. PATENT DOCUMENTS

| | | | |
|---|---|---|---|
| 4,506,955 | 3/1985 | Kmetz | 349/143 |
| 5,019,201 | 5/1991 | Yabu et al. | 156/273.9 |
| 5,029,984 | 7/1991 | Adachi et al. | 350/334 |
| 5,150,231 | 9/1992 | Iwamoto et al. | 359/44 |
| 5,193,022 | 3/1993 | Hirai | 349/150 |
| 5,270,848 | 12/1993 | Takabayashi | 359/88 |
| 5,283,677 | 2/1994 | Sagawa et al. | 359/88 |
| 5,353,196 | 10/1994 | Takahashi | 361/760 |
| 5,360,943 | 11/1994 | Mori et al. | 174/84 R |
| 5,432,626 | 7/1995 | Sasuga et al. | 359/83 |
| 5,670,994 | 9/1997 | Kawaguchi et al. | 349/150 |
| 5,739,887 | 4/1998 | Ueda et al. | 349/149 |

FOREIGN PATENT DOCUMENTS

| | | | |
|---|---|---|---|
| 0455233 | 11/1991 | European Pat. Off. . | |
| 0 567 209 | 10/1993 | European Pat. Off. . | |
| 63-300224 | 12/1988 | Japan | 349/149 |
| 2-163725 | 6/1990 | Japan | 349/143 |
| 5257142 | 10/1993 | Japan . | |

*Primary Examiner*—William L. Sikes
*Assistant Examiner*—Toan Ton
*Attorney, Agent, or Firm*—Fitzpatrick, Cella, Harper & Scinto

[57] ABSTRACT

A display device is provided with a display element having first electrodes and second electrodes, first drive unit connected to the first electrodes and adapted to provide the first electrodes with a voltage, second drive unit connected to the second electrodes and adapted to provide the second electrodes with a voltage, and drive control unit adapted to control the first and second drive unit and to supply a first reference voltage.

A reference potential wiring for providing the reference potential of the first drive unit and a reference potential wiring for providing the reference potential of the second drive unit are shortcircuited in the vicinity of the first and second drive unit.

6 Claims, 7 Drawing Sheets

DISPLAY DEVICE WITH PARTICULAR EXTERNAL CONNECTIONS

BACKGROUND OF THE INVENTION

1. Field of the Invention

The present invention relates to a display device such as a liquid crystal display, a plasma display, a DMD display, an electrochromic display or an electron emission element array, and more particularly to the connection method for the reference potential wiring for the drive means for such display.

2. Related Background Art

For facilitating the understanding of the difference between the present invention and the conventional configuration, there will at first be explained, as an example, a liquid crystal display device.

There have conventionally been proposed various apparatus equipped with the liquid crystal display device, of which an example is illustrated in FIG. 1.

As is already known, a liquid crystal display P is provided with a pair of substrates arranged in mutually opposed manner, between which ferroelectric liquid crystal is injected. On the substrates there are respectively formed a plurality of stripe-shaped common electrodes 1 (first electrode group) and a plurality of stripe-shaped segment electrodes 2 (second electrode group), the electrodes constituting a matrix electrode array.

These common electrodes 1 are connected to common drive circuits (first drive means or first drive circuits) 3, which are in turn connected to a bus board (first drive means or first bus board) 7. The bus board 7 is connected to a control board (control means) 9 through two cables 7A, 7B of which the cable 7A serves to provide the common drive circuits 3 with power supply voltages V1, VC, V2 as reference voltages. In response to the supply of the power supply voltage V1, the common drive circuits 3 suitably apply a common signal of a predetermined wave form to the common electrodes 1. A power supply voltage and control signals for driving the common drive circuits 3 are supplied through the other cable 7B.

On both sides of the liquid crystal display device P there are respectively provided segment drive circuits (second drive means or second drive circuits) 5, 6 to which the segment electrodes 2 are alternately connected, as partly illustrated in FIG. 1. These segment drive circuits 5, 6 are respectively connected to bus boards (second drive means or second bus boards) 10, 11, which are in turn connected to the control board 9 respectively through two cables 10A, 10B and 11A, 11B. The cables 10A, 11A serve to provide the segment drive circuits 5, 6 with power supply voltages V3, VC, V4. In response to the supply of the power supply voltage V3, the drive circuits 5, 6 apply a segment signal of a predetermined wave form to the segment electrodes 2. A power supply voltage and drive signals for driving the segment drive circuits 5, 6 are supplied the other cables 10B, 11B. The liquid crystal display device P is driven by the signal application by these electrodes 1, 2.

The conventional device has been associated with a drawback that a steeply varying current generated at the switching of liquid crystal flows into the power supply lines for the liquid crystal, thereby causing, by electromagnetic induction, a variation for example in the reference ground potential. Such variation becomes particularly large in the display of certain specified patterns, thus eventually inducing an erroneous function of the drive circuits. For resolving such variation in the ground potential, the present inventors have investigated a method of connecting the ground of the bus boards with a metal casing, but such method has been identified as difficult to adopt because of the structure of the device.

SUMMARY OF THE INVENTION

In consideration of the foregoing, an object of the present invention is to provide a display device with stable display performance, by electrically connecting the reference potentials of the first and second drive means in a method to be explained later, thereby preventing the variation of the reference potential.

Another object of the present invention is to provide a display device capable of preventing the variation of the reference potential in inexpensive manner, by connecting the first and second drive means through electrodes inside the liquid crystal display device.

The foregoing objects can be attained, according to the present invention, by a display device provided with a display element having first electrodes and second electrodes, first drive means connected to the first electrodes and adapted to supply the first electrodes with a voltage, second drive means connected to the second electrodes and adapted to supply the second electrodes with a voltage, and drive control means adapted to control the first and second drive means and to supply a reference voltage, wherein a reference potential wiring for giving a reference potential to the first drive means and a reference potential wiring for giving a reference potential to the second drive means are shortcircuited either in the vicinity of the first and second drive means or through a flexible cable.

In the above-explained configuration, the drive control means sends a reference voltage to the firsts and second drive means, which in response apply signals of predetermined wave forms respectively to the first and second electrodes, whereby the liquid crystal is suitably switched to display arbitrary information. On the other hand, the variation of the reference potential at the switching of the liquid crystal can be prevented, as the reference potentials of the first and second drive means are electrically connected mutually, in the vicinity of the display element.

DETAILED DESCRIPTION OF THE PREFERRED EMBODIMENTS

Figure 2:
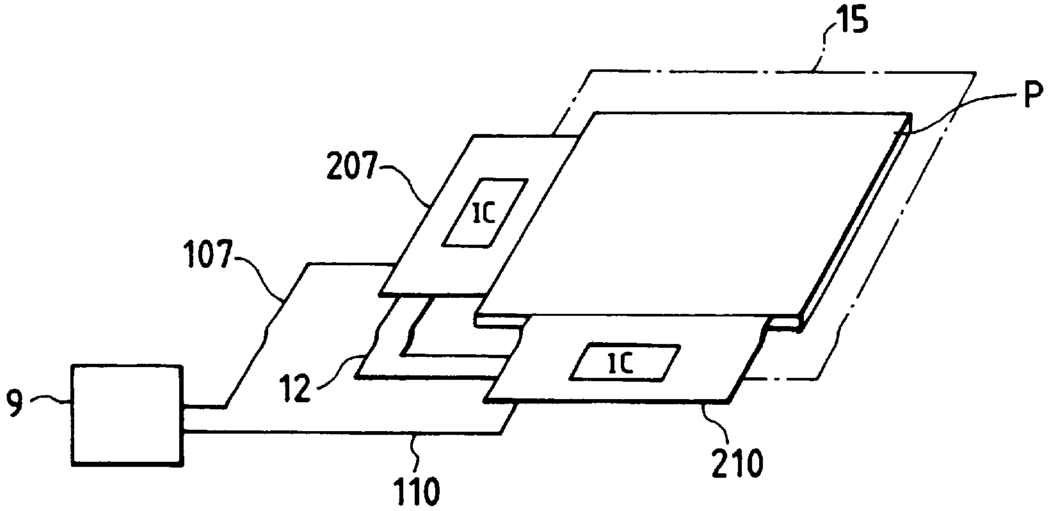
FIG. 2 is a schematic perspective view of an example of the display device constituting a preferred embodiment of the present invention.

FIG. 2 is a schematic view showing an example of the display device, constituting a preferred embodiment of the present invention.

A display element P, illustrated as a rectangular display panel, is provided with first and second electrodes (not shown).

First drive means 207 is connected to the first electrodes of the display element P and provides the electrodes with driving voltage signals. It is illustrated, in FIG. 2, as a TAB film board on which a driving IC chip is mounted.

Similarly second drive means 210 is connected to the second electrodes of the display element P and provides the electrodes with driving voltage signals. It is illustrated, in FIG. 2, as a TAB film board on which a driving IC chip is mounted.

Drive control means 9 for controlling the first and second drive means 207, 210 provides the first drive means with a reference voltage for generating drive signals, an IC chip controlling signal and a reference potential, through a signal line 107.

Similarly a signal line 110 provides a reference voltage, a control signal and a reference potential.

The reference potential mentioned in the present invention is a potential level, which is generally called a ground potential and which is the lowest or highest potential respectively if a positive or negative power supply voltage is required for driving the IC's and display element. It also becomes an intermediate potential in case there are used both positive and negative power supply voltages. The reference potential is usually the reference potential level common to the various circuits of driving IC, power IC, analog IC, logic IC etc. employed in the display device.

On the other hand, the reference voltage means a voltage taken as reference only in a specified IC, such as V1, VC and V2, or V3, VC and V4 to be explained later. Some of these reference voltages are not used for example in the logic IC in the control means 9.

In the present invention, a wiring 12 is provided in the vicinity of the display element to mutually shortcircuit ground wirings (not shown), which are the reference potential wirings of the drive means 207, 210. Thus the potential of the ground wirings varies less even when a large current flow by the drive of the display element P.

Also if the wiring 12 is composed of a flexible cable, it is made possible to reduce the failure in electrical contact even in case the drive means 207, 210 move in position, as the wiring 12 can deform accordingly.

It is also possible to eliminate either of the signal lines 107, 110 and to provide such drive means lacking the signal line, with the necessary voltages and signals through the other signal line and the wiring 12. It is furthermore preferable to provide, if necessary, a wiring as indicated by a chain line 15 for shortcircuiting the reference potential wirings.

The liquid crystal element P to be employed in the present invention is preferably composed of a ferroelectric liquid crystal element or an antiferroelectric liquid crystal element of a simple matrix structure. However, other display element, such as a TN liquid crystal element, an STN liquid crystal element, a plasma display element, a plasma-addressed liquid crystal element, a DMD element or a light-emitting element, may also be employed for this purpose.

The first electrodes are preferably composed of common electrodes such as the scanning electrodes or the counter electrodes, while the second electrodes are preferably composed of segment electrodes for providing the data signals. The first and second electrodes are in mutual capacity coupling.

The first drive means is preferably composed of an IC provided therein with a scanning circuit with a decoder and switches, while the second drive means is preferably composed of a segment drive IC provided therein with shift registers, latches, switches etc. Such IC can be at least an IC chip mounted on a flexible board or a rigid board.

More preferably there is employed a structure having plural IC chips mounted on a TAB film and also having a bus board commonly connected to these chips. In such structure, the driving reference voltages, the control signal and the reference potential can be given to the IC chips through the bus board. Consequently the bus board is preferably composed of a multi-layered printed circuit board.

The wiring 12 is preferably composed of a flexible cable, called a flexible printed circuit board (FPC) or a flexible flat cable (FFC). According to the present invention, since the reference potential wirings are shortcircuited by the wiring 12, the casing for the display element P and the drive means 207, 210 can be constructed with insulating resin of light weight, instead of a metal.

Figure 3:
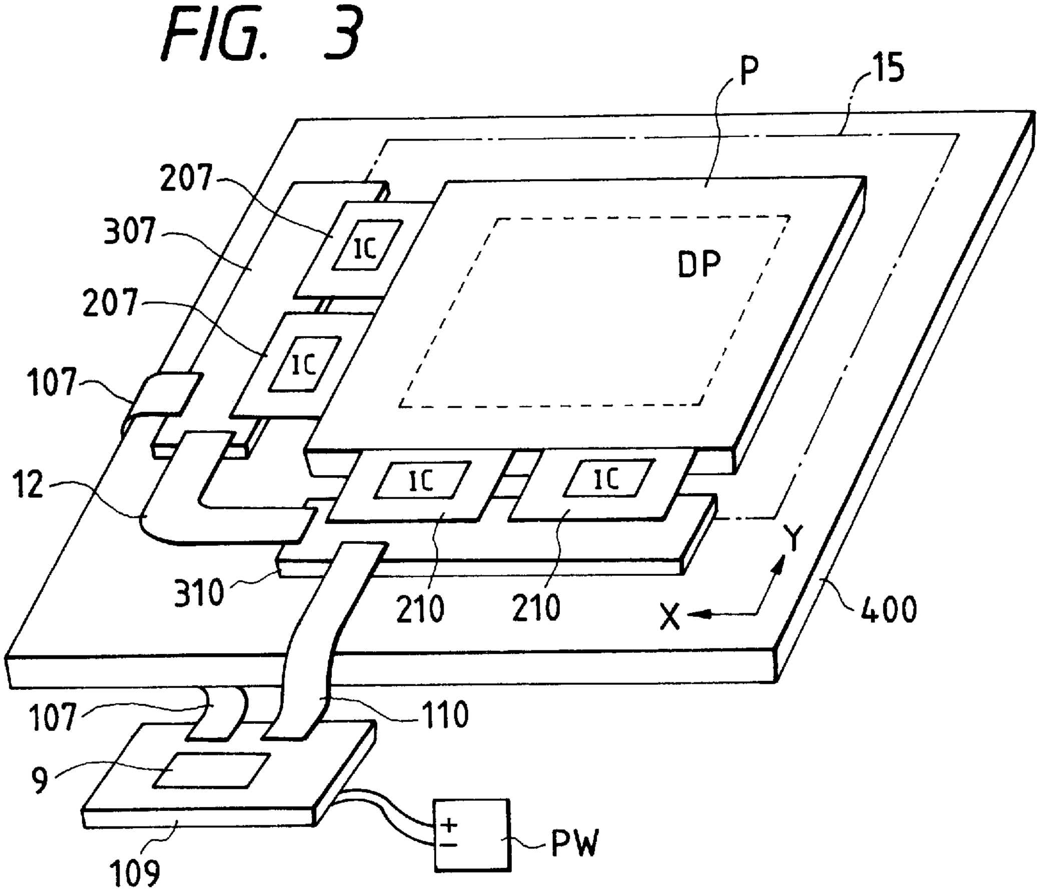
FIG. 3 is a schematic perspective view of another example of the display device constituting a preferred embodiment of the present invention.

FIG. 3 shows a display device constituting another preferred embodiment of the present invention, with an additional structure to the device shown in FIG. 2. This device is suitable for a large-sized display area DP with a diagonal size of at least 6 inches, preferably at least 14 inches.

The above-mentioned display device is different from the foregoing one in FIG. 2 in that there are provided common bus boards 307, 310 respectively for plural drive IC chips 207, 210 for driving the display element P.

The drive control means 9 is mounted on a drive control IC board 109, which is connected to the common bus boards 307, 310 respectively through flexible cables 107, 110. Also the power supply voltage is supplied from a power supply circuit PW.

A support member 400, for supporting the bus boards 307, 310 is composed of light-weight insulating resin.

Figure 4:
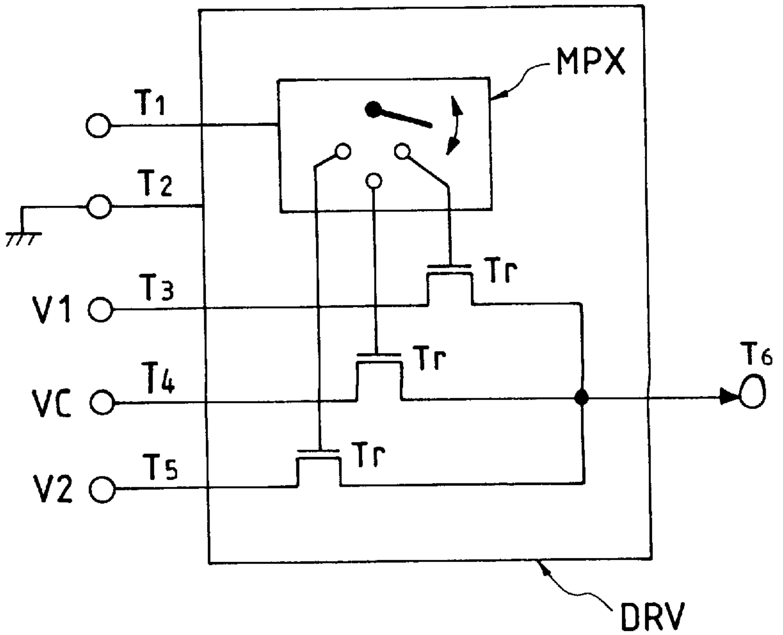
FIG. 4 is a circuit diagram of an example of the drive circuit adapted for use in the present invention.

FIG. 4 is a schematic diagram of the drive means employed in the present invention, particularly a circuit DRV for the drive IC chip, with input terminals T1 to T5 and an output terminal T6. The terminal T1 is used for entering the power supply voltage Vcc and a clock signal. The terminal T2 is a reference potential terminal connected through the wiring 12 and a common bus board to the other bus board. The terminals T3, T4, T5 are used for entering the driving reference voltages V1, VC, V2 which, supplied in parallel manner, are transmitted by a multiplexer MPX at suitable timings and through a transistor Tr to the output terminal T6, thereby providing a drive signal (scanning signal) of a wave form to be explained later. In the actual circuit, the terminal T6 is provided in a number same as that of the common electrodes of the display element P.

There will next be explained embodiments realizing the above-mentioned configurations, but the present invention is by no means limited to such embodiments but the configurations in which the components are replaced by substitutes or equivalents within an extent of attaining the objects of the present invention are also included in the present invention.

Figure 1:
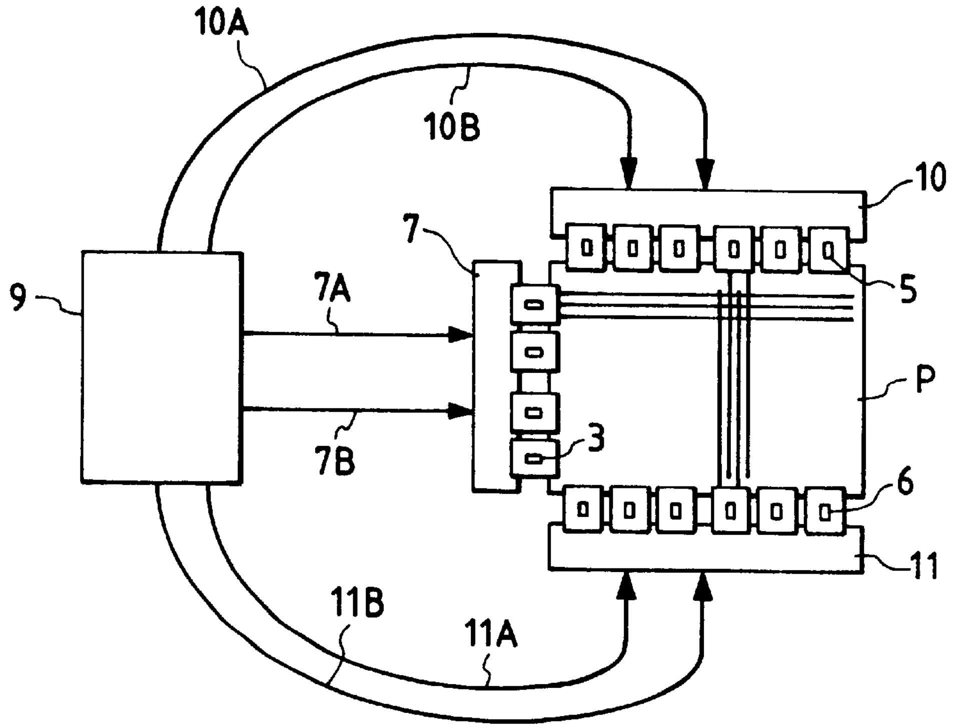
FIG. 1 PRIOR ART
FIG. 1 is a schematic view of an example of the conventional display device.

Now the embodiments of the present invention will be explained with reference to the attached drawings, in which components that are the same as those in FIG. 1 are represented by the same symbols and will not be explained further.

[Embodiment 1]

First a first embodiment of the present invention will be explained with reference to FIGS. 5 to 8.

Figure 5:
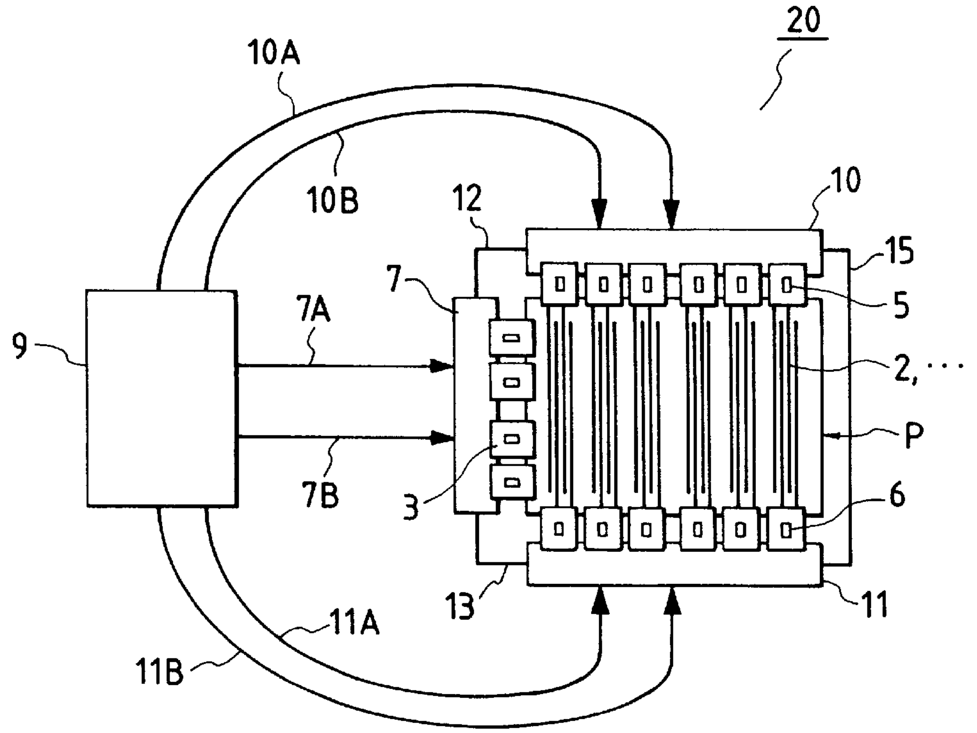
FIG. 5 is a block diagram of a device constituting a first embodiment of the present invention.

In a display device 20 of the present embodiment, a bus board (first drive means; first bus board) 7 and a bus board (second drive means; second bus board) 10 are connected by a cable 12 as shown in FIG. 5, while the bus board 7 and another bus board (second drive means; second bus board) 11 are connected by a cable 13. Besides the ground of the bus board 10 and that of the bus board 11 are connected by a cable 15.

Figures 6A, 6B, 6C, 6D, 6E:
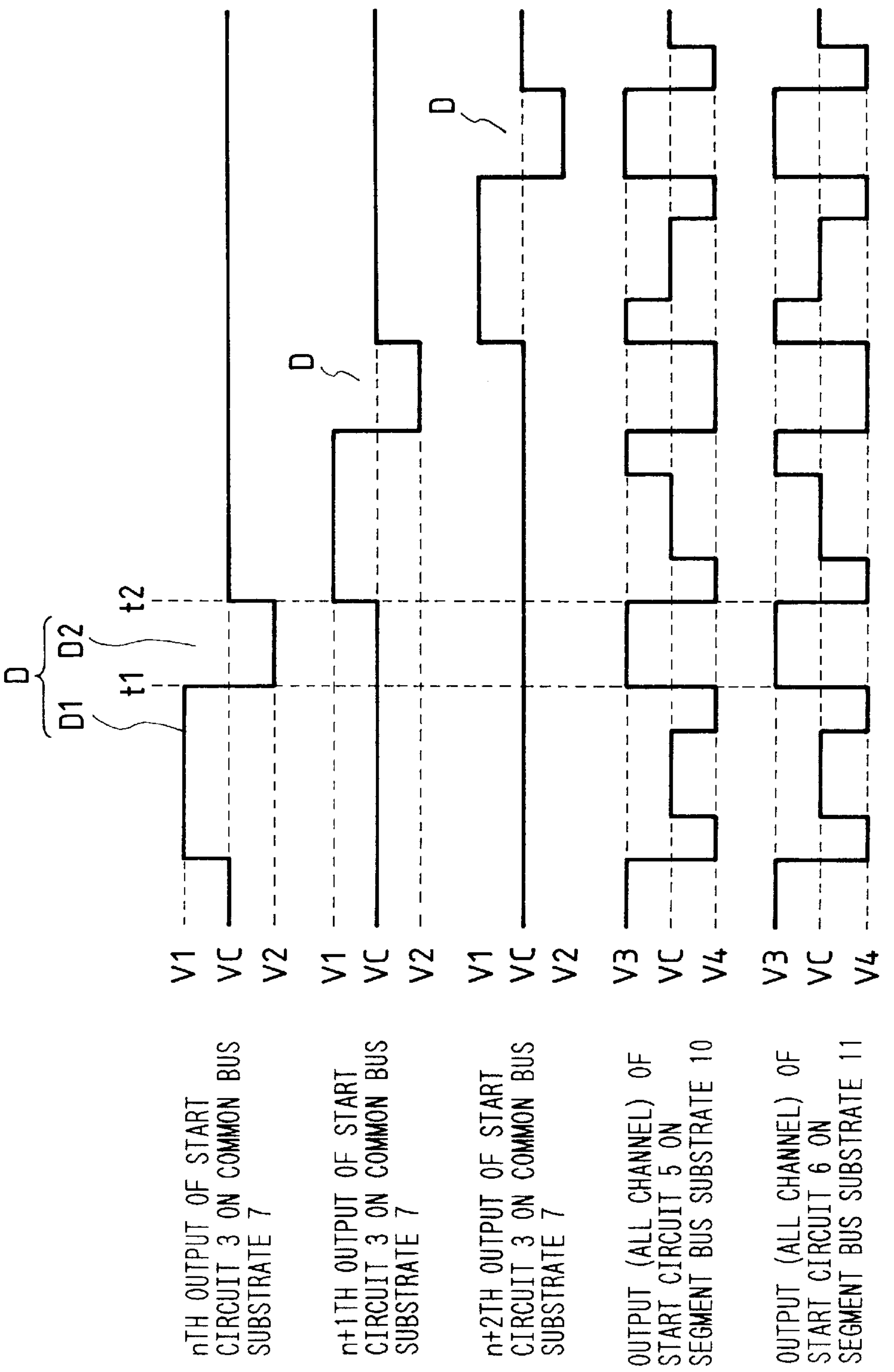
FIGS. 6A to 6E are charts showing forms of various signals applied to the liquid crystal display device.

A common drive circuit (first drive means; first drive circuit) 3 is so constructed as to receive power supply voltages V1, VC and V2 and to provide common electrodes (first electrode group) 1 with common signals D as shown in FIGS. 6A to 6C. As shown in FIG. 6A, the common signal D is composed of a reset pulse D1 and an immediately succeeding selecting pulse D2, and it is applied in succession to the common electrodes 1, as shown in FIGS. 6A to 6C, thereby effecting line-sequential scanning. FIGS. 6A to 6C show the mode of line-sequential scanning in the n-th, (n+1)-th and (n+2)-th common electrodes, and the line-sequential scanning is conducted in a similar manner also for the remaining common electrodes. Also as will be understood from FIGS. 6A to 6C, while the common signal D is applied to a common electrode (for example n-th common electrode), a constant voltage VC is applied to other common electrodes. Thus, for example, in case of a duty ratio of 1/480, while a potential V1 or V2 is applied to any line, a potential VC is applied to other 479 lines.

On the other hand, segment drive circuits (second drive means; second drive circuits) 5, 6 are so constructed as to receive power supply voltages V3, VC and V4 and to provide segment electrodes (second electrode group) 2 with signals shown in FIGS. 6D and 6E. As will be apparent from this chart, the segment electrodes receive the voltage of a same wave form, which is synchronized with the common signals D.

Figures 7A, 7B, 7C, 7D, 7E:
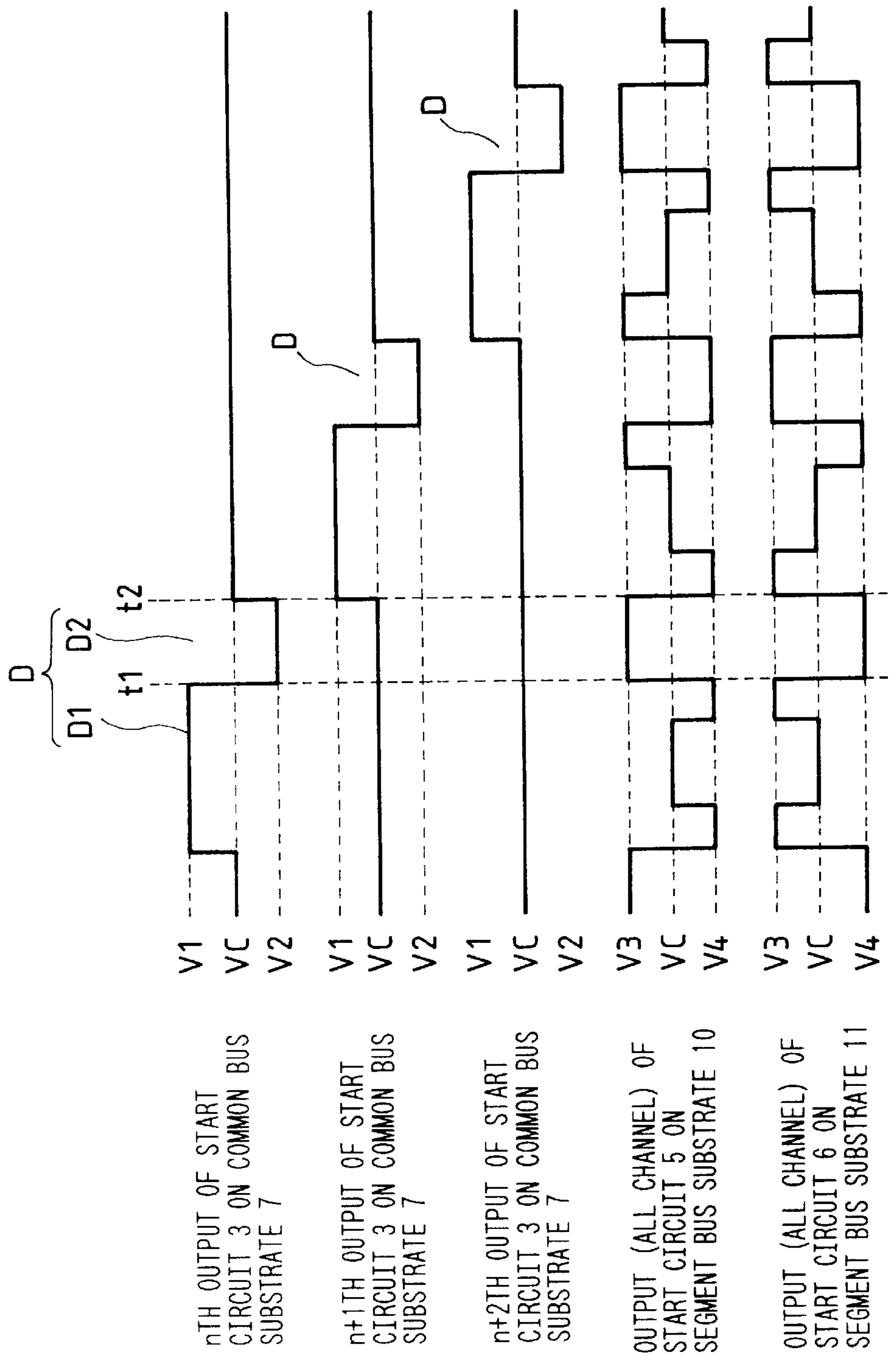
FIGS. 7A to 7E are charts showing another example of wave forms of various signals applied to the liquid crystal display device.

Also signals shown in FIGS. 7D and 7E are applied to the segment electrodes 2. The signal applied by the bus board 10 through a segment drive circuit 5 (cf. FIG. 7D) and that applied by the bus board 11 through a segment drive circuit 6 (cf. FIG. 7E) are so mutually correlated that, when either of the signals is at a potential V3, the other is at a potential V4 and, when either is at a potential VC, the other is also at the potential VC.

In the following the circuit of the display device 20 will be explained with reference to FIG. 8.

Figure 8:
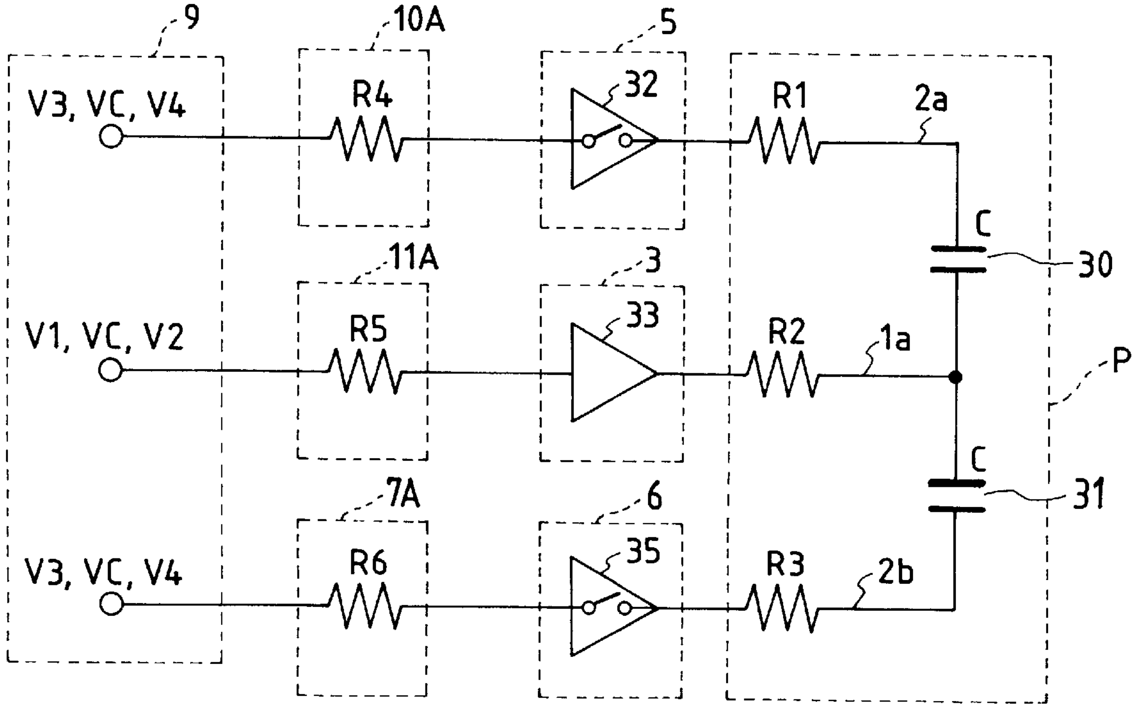
FIG. 8 is an equivalent circuit diagram for explaining the configuration of the display device of the first embodiment.

In FIG. 8 there are shown a pixel 30 formed by a segment electrode 2*a* and a common electrode 1*a*, and a pixel 31 formed by a segment electrode 2*b* and a common electrode 1*a*. C indicates the electrostatic capacity between the common and segment electrodes, and R1, R2 and R3 indicate the internal resistances of the electrodes 2*a*, 1*a* and 2*b*. In the drive circuits 5, 3, 6, there are respectively provided switching elements 32, 33, 35. R4, R5 and R6 respectively indicate the internal resistances of the cables 10A, 11A and 7A. The power supply voltages V3, VC, V4 are supplied through the cable 10A to the drive circuit 5, then converted by the switching element 32 into the signal of a predetermined form and supplied to the segment electrode 2*a*. Similarly the power supply voltages V1, VC, V2 are supplied through the cable 11*a* to the drive circuit 3, then converted by the switching element 33 into the signal of a predetermined form and supplied to the common electrode 1*a*.

In the following there will be explained the function of the present embodiment when the signals shown in FIGS. 6A to 6E are applied.

When the display device 20 is put into operation, the power supply voltages and the control signal for driving the common drive circuit 3 are supplied thereto from the control board (control means) 9 through the cable 7B and the bus board 7, and the power supply voltages and the control signal for driving the segment drive circuits 5, 6 are supplied thereto from the control board 9 through the cables 10B, 11B.

On the other hand, the power supply voltages V1, VC, V2 are supplied from the control board 9 through the cable 7A and the bus board 7 to the common drive circuit 3 and converted therein into the common signals D of the above-explained wave form. The common signals D are applied in succession to the common electrodes 1, by the line-sequential scanning explained above. Also the power supply voltages V3, VC, V4 are supplied through the cables 10A, 11A to the segment drive circuits 5, 6, and are converted therein into the signals as shown in FIGS. 6D and 6E, which are supplied to the segment electrodes 2. Since the signal forms are same, all the segment electrodes 2 in the liquid crystal display element P are always at a same potential.

Under such voltage application, at a time t1 of liquid crystal switching, the common electrodes 1 not receiving the common signal D are given the constant voltage VC as explained above, and all the segment electrodes 2 are given the same voltage V3. Consequently, over the almost entire area of the liquid crystal display element P, currents flow from the segment lines of the potential V3 to the common lines of the potential VC (i.e. from the segment bus boards 10, 11 to the common bus board 7). Also at a time t2 of another liquid crystal switching, all the segment electrodes 2 are given the voltage V4 while almost all the common electrodes 1 are given the constant voltage VC. In this state, over the almost entire area of the liquid crystal display element P, currents flow from the common lines of the potential VC to the segment lines of the potential V4 (i.e. from the common bus board 7 to the segment bus boards 10, 11).

Thus, at the times t1 and t2, there flow steeply varying currents in the power supply voltage line (for V3, VC, V4) on the bus board and in the power supply voltage lines on the cables. These lines are positioned adjacent to the ground lines constituting the reference potential wirings, and induced currents are generated in the ground lines by an electromotive force caused by electromagnetic induction. At the times t1 and t2, the direction of the electromotive force is inverted as the direction of the current is opposite.

In the conventional display device, in which the bus board 7 is not connected with the bus boards 10, 11, a current for cancelling the electromotive force flows to the control board 9 through one of the cables and further flows through the other cable. Because of the very high impedance of the path of the current, which is inevitably considerably long, there cannot be obtained a satisfactory response to such steeply varying current caused by the electromagnetic induction.

In constant, in the present embodiment, where the bus board 7 is connected with the bus boards 10, 11 through the cables 12, 13, the cancelling currents can flow through the cables 12, 13. Since these cables 12, 13 are short, the impedances therein can be made low, and it is thus rendered possible to suppress the variation in the ground levels of the common bus board 7 and the segment bus boards 10, 11 which show variations in the mutually opposite manner.

The function of the present embodiment in case of application of the signals shown in FIGS. 7A to 7E will now be explained.

In this case, at a time t1, the segment electrodes 2 connected to the drive circuit 5 receive a voltage V3 while those 2 connected to the drive circuit 6 receive a voltage V4, so that a potential difference is created between the mutually adjacent segment electrodes 2. As a result, a current flows from the line of the potential V3 of the segment bus board 10 to the line of the potential V4 of the segment bus board 11. On the other hand, at a time t2, the applied voltages are inverted, so that the drive circuit 5 applies the voltage V4 while the drive circuit 6 applies the voltage V3. As a result, a current flows from the line of the potential V3 of the segment bus board 11 to the line of the potential V4 of the segment bus board 10. Thus, in case of the application of the signals shown in FIGS. 7A to 7E, a current flows between the segment bus boards 10 and 11, though the direction of the current varies depending on the time, and a current is generated by th electro-magnetic induction in the neighboring ground line.

In the conventional display device, in which the bus boards 10 and 11 are not mutually connected, a current for cancelling the electromotive force flows to the control board 9 through one of the cables and further flows through the other cable. Because of the very high impedance of the path of the current, which is inevitably considerably long, there cannot be obtained a satisfactory response to the steeply varying current caused by the electromagnetic induction.

In contrast, in the present embodiment, where the bus boards 10 and 11 are mutually connected by the cable 15, the cancelling current can flow therethrough. Also in this case the impedance can be kept low, and it becomes possible to suppress the variation in the ground level of the segment bus boards 10 and 11 which show variations in a mutually opposite manner.

Thus the present embodiment can provide the following effects.

In the present embodiment, the variation in the ground potential, generated at the switching of liquid crystal, can be suppressed by connecting the bus boards 7, 10, 11 with the cables 12, 13, 15. Such suppression is particularly effective for a large variation in the ground potential, encountered at the display of specified display patterns, and there can be obtained stable display performance for any display pattern.

[Embodiment 2]

In the following there will be explained another embodiment with reference to FIG. 9, in which same components as those in FIGS. 4 and 5 are represented by same symbols and will not be explained further.

In a display device 50 of the present embodiment, the control board 9 is connected with the bus board 10 or 11, respectively with only one cable 10B or 11B, while the bus boards 10 and 7 are connected through two cables 12, 51, and the bus boards 11 and 7 are connected through two cables 13, 52. The supply of the liquid crystal driving lower power to the bus boards 10, 11 is conducted, not through the cables 10A, 11A from the control board 9 as in the foregoing embodiment, but through the cable 7A, the bus board 7 and the cables 51, 52. The power supply voltages and the control signal for driving the segment drive circuits 5, 6 are supplied, as in the foregoing embodiment, through the cables 10B, 11B.

The present embodiment functions in the following manner. At the switching of liquid crystal, there flow steeply varying currents in the power supply system as in the foregoing embodiment, and induction currents are generated, as a result, in the ground lines. In the present embodiment, however, since the bus boards 10, 7, 11 are mutually connected by the cables 51, 52, 15, the current flow path becomes short, with reduced impedance, whereby the variation in the ground level can be suppressed.

Thus the present embodiment can provide the following effects.

In the present embodiment, the variation in the ground potential, generated at the switching of liquid crystal, can be suppressed by connecting the bus boards 7, 10, 11 with the cables 51, 52, 15. Such suppression is particularly effective for a large variation in the ground potential, encountered at the display of specified patterns, and there can be obtained stable display performance for any display pattern.

[Embodiment 3]

Figure 9:
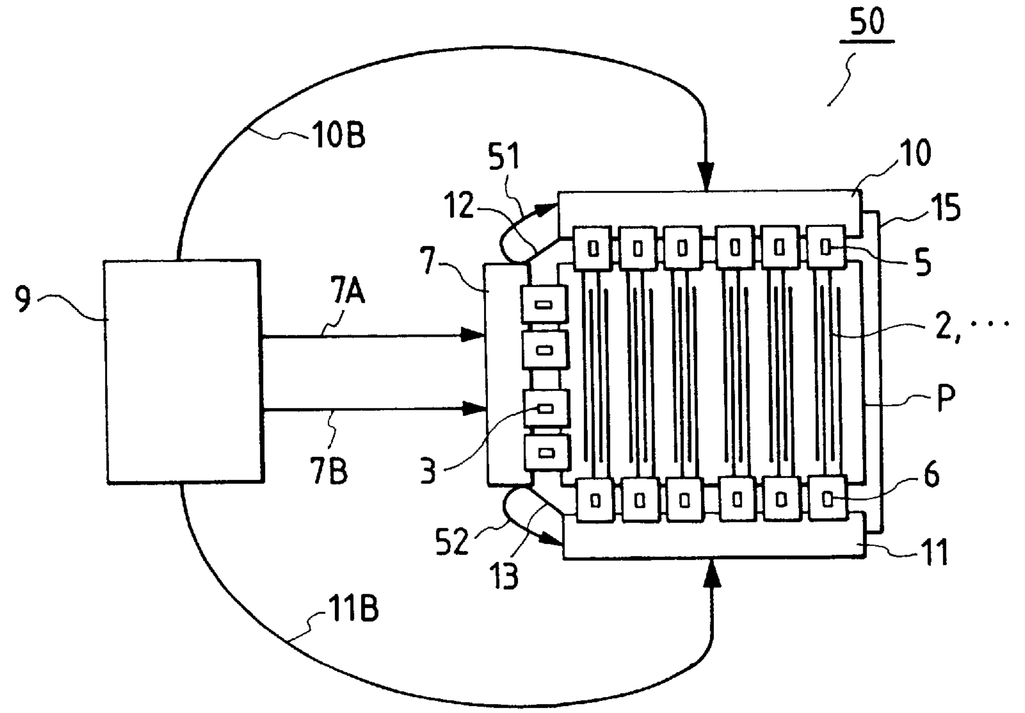
FIG. 9 is a block diagram of a device constituting a second embodiment of the present invention.
Figure 10:
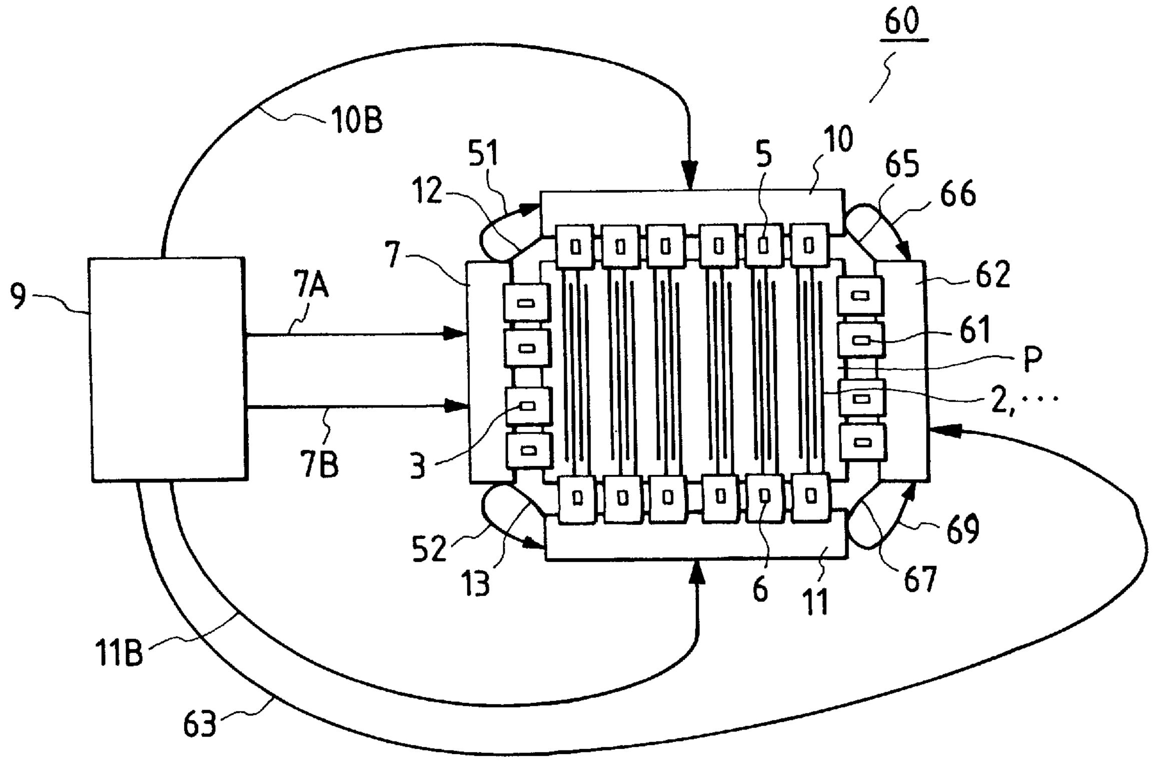
FIG. 10 is a block diagram of a device constituting a third embodiment of the present invention.

In the following there will be explained still another embodiment of the present invention with reference to FIG. 10, in which components same as those in FIG. 9 are represented by same symbols and will not be explained further.

In a display device 60 of the present embodiment, common drive circuits 3, 61 are provided on both lateral ends of the liquid crystal display element P, and the common electrodes 1 are alternately connected to the common drive circuits 3, 61. The common drive circuit 61 at the right-hand side is connected to a bus board 62, which is in turn connected to the control board 9 by a cable 63. Also the bus board 62 is connected to the segment bus board 10 by two cables 65, 66, and is connected to the segment bus board 11 by two cables 67, 69. The supply of the liquid crystal driving power to the bus board 62 is conducted through the cable 7A, the bus board 7, the cables 51, 52, the bus boards 10, 11 and the cables 66, 69, while the power supply voltages and the control signal for driving the common drive circuit 61 are supplied from the control board 9 to the bus board 62 directly through the cable 63.

The present embodiment functions in the following manner.

At the switching of liquid crystal, there flow steeply varying currents in the power supply system as in the foregoing embodiments, and induction currents are generated, as a result, in the ground lines. In the present embodiment, however, since the bus boards 7, 10, 11, 62 are mutually connected by the cables 15, 51, 52, 65, 67, the current flow path becomes short, with reduced impedance, whereby the variation in the ground potential can be suppressed.

Thus the present embodiment can provide the following effects.

In the present embodiment, the variation in the ground potential, generated at the switching of liquid crystal, can be suppressed by connecting the bus boards 7, 10, 11, 62 with the cables 15, 51, 52, 65, 67. Such suppression is particularly effective for a large variation in the ground potential, encountered at the display of specified patterns, and there can provide stable display performance for any display pattern. Also similar effects can naturally be obtained even in a configuration in which the liquid crystal driving power is supplied respectively to the bus boards.

[Embodiment 4]

Figure 11:
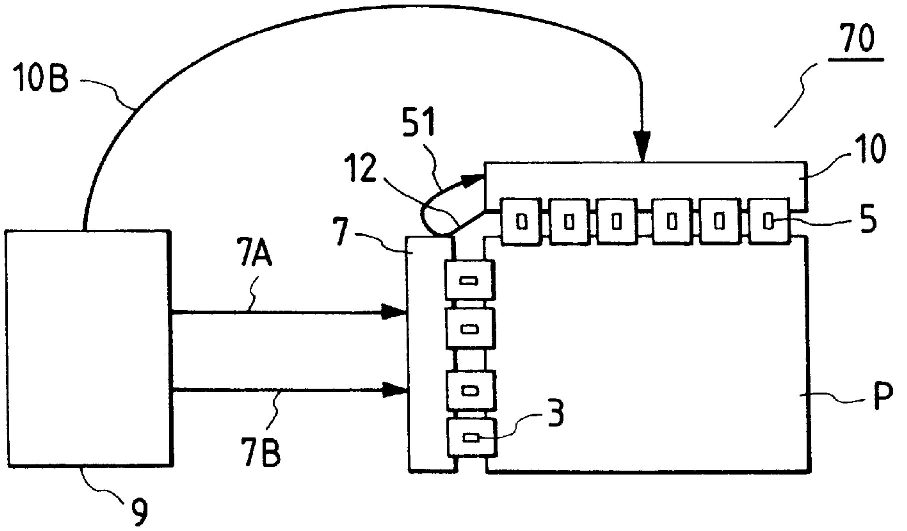
FIG. 11 is a block diagram of a device constituting a fourth embodiment of the present invention.

In the following there will be explained still another embodiment of the present invention, with reference to FIG. 11.

A display device 70 of the present embodiment, the liquid crystal display element P is provided with a segment bus board 10 and a common bus board 7. The supply of the liquid crystal driving power to the segment bus board 10 is conducted through the cable 7A, the bus board 7 and the cable 51, while the power supply voltages and the control signal for driving the segment drive circuit 5 are supplied from the control board 9 directly through the cable 10B. Also the bus boards 7 and 10 are connected through the cable 12, thereby suppressing the variation in the ground potential at the switching of liquid crystal.

The present embodiment provides the following effects.

In the present embodiment, since the bus boards 7 and 10 are mutually connected through the cable 12, there can be prevented the variation in the ground potential at the switching of liquid crystal, and there can be obtained stable display performance. Also similar effects can naturally be obtained even in a configuration in which the liquid crystal driving power is supplied respectively to the bus boards.

[Embodiment 5]

Figure 12:
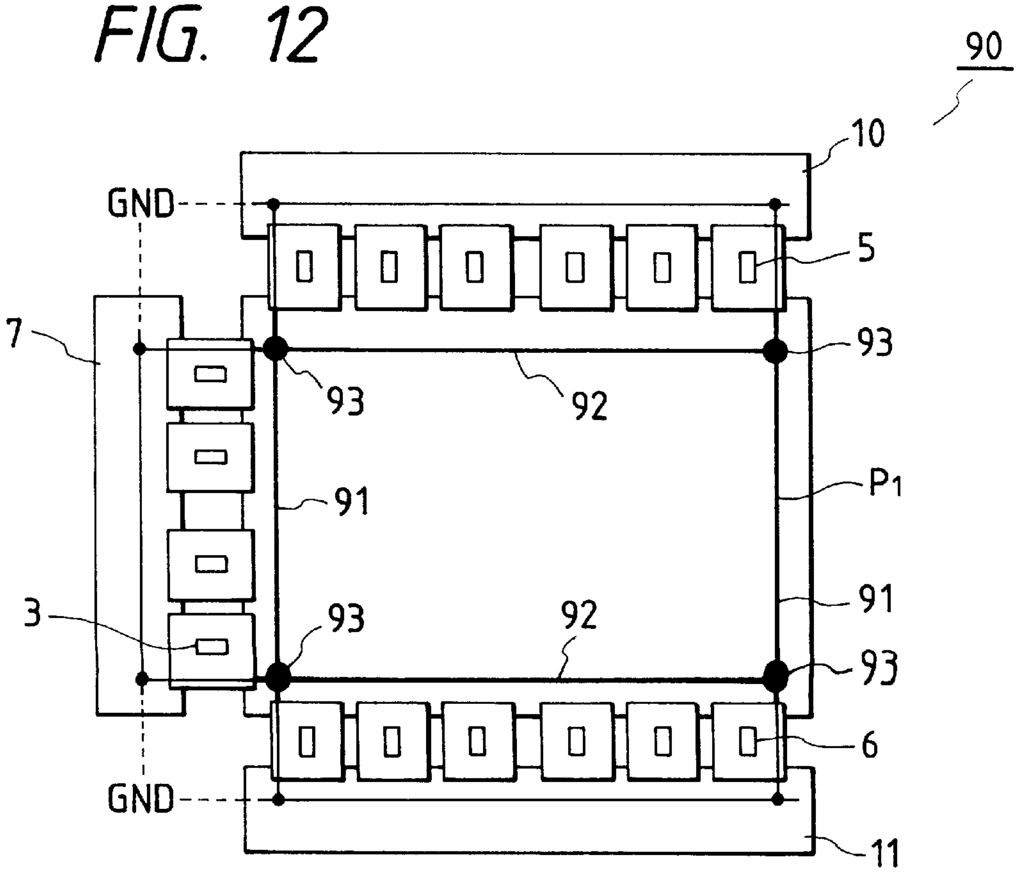
FIG. 12 is a block diagram of a device constituting a fifth embodiment of the present invention.

In the following there will be explained still another embodiment of the present invention, with reference to FIG. 12.

In a display device 90 of the present embodiment, the ground lines of the bus boards 7, 10, 11 are not connected by the cables as in the foregoing embodiments, but are connected inside the liquid crystal display element P. The liquid crystal display element P is provided, in addition to the information display electrodes, with electrodes 91, which are connected to the ground lines of the segment bus boards 10, 11 through dummy electrodes positioned at both ends of flexible TCP (tape carrier package) on which the drive circuits 5, 6 are mounted. Furthermore, the liquid crystal display element P is provided with electrodes 92, which are connected to the ground line of the common bus board 7. These electrodes 91, 92 are mutually connected at the crossing portions thereof (hereinafter called interconnecting portions) 93, thereby connecting the ground lines of the segment bus boards 10, 11 and the ground line of the common bus board 7.

The present embodiment provides the following effects.

In the present embodiment, since the ground lines of the bus boards are mutually connected, there can be prevented the variation in the ground potential at the switching of liquid crystal, and there can be obtained stable display performance. Also the present embodiment dispenses with the cables and connectors for connecting the bus boards, thereby allowing to reduce the cost.

As explained in the foregoing, the present invention allows to prevent the variation in the reference potential at the switching of liquid crystal, since the reference potential of the first drive means and that of the second drive means are electrically connected. Such variation, which becomes particularly conspicuous in the display of certain specified patterns, can be securely prevented. As a result, there can be attained stable display performance.

Also such connection of the reference potentials, if realized by a cable, is less expensive in comparison with the case where such connection is realized by a metal casing. An even less expensive configuration can be realized by making the connection by the electrodes inside the liquid crystal display element.

What is claimed is:

1. A display device provided with a display element including a common electrode group and a segment electrode group, a common bus board connected to said common electrode group, an upper segment bus board connected to said segment electrode group, an under segment bus board connected to said segment electrode group, and control means for providing said common bus board, said upper segment bus board and said under segment bus board with electric power supply, wherein said common bus board, said upper segment bus board and said under segment bus board, receiving the electric power supply from said control means, provide said common and segment electrode group with signals having predetermined wave forms, thereby effecting information display by said display element, wherein:

a reference potential wiring at said common bus board and a reference potential wiring at said upper and under segment bus boards are connected directly through first wirings; and a reference potential wiring at an end of said upper segment bus board and a reference potential wiring at an end of said under segment bus board are connected directly through a second wiring.

2. A display device according to claim 1, wherein the first and second wirings are flexible.

3. A display device according to claim 1 or 2, wherein said display element is a non-active matrix liquid crystal display element.

4. A display device according to claim 1 or 2, wherein said display element is an element employing chiral smectic liquid crystal.

5. A display device according to claim 1 or 2, wherein said display element is a ferroelectric liquid crystal display element or an antiferroelectric liquid crystal display element.

6. A display device according to claim 1, wherein a ground line of said common bus board and that of said segment bus board are mutually connected through an electrode inside said display element.

* * * * *

UNITED STATES PATENT AND TRADEMARK OFFICE

CERTIFICATE OF CORRECTION

PATENT NO. : 6,160,605
DATED : December 12, 2000
INVENTOR(S) : Kazuhiko Murayama, et al.

It is certified that error appears in the above-identified patent and that said Letters Patent is hereby corrected as shown below:

Title page,
Item [56] References Cited, under FOREIGN PATENT DOCUMENTS "5257142" should read -- 5-257142 --.

Column 7,
Line 26, "th" should read -- the --.

Signed and Sealed this

Thirteenth Day of November, 2001

Attest:

Nicholas P. Godici

NICHOLAS P. GODICI

*Attesting Officer* *Acting Director of the United States Patent and Trademark Office*